United States Patent
Lim

(10) Patent No.: US 9,705,163 B2
(45) Date of Patent: Jul. 11, 2017

(54) BATTERY MODULE

(71) Applicants: SAMSUNG SDI CO., LTD., Yongin-si, Gyeonggi-do (KR); ROBERT BOSCH GMBH, Stuttgart (DE)

(72) Inventor: Young-Bin Lim, Yongin-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 263 days.

(21) Appl. No.: 14/144,724

(22) Filed: Dec. 31, 2013

(65) Prior Publication Data
US 2014/0193685 A1    Jul. 10, 2014

(30) Foreign Application Priority Data
Jan. 4, 2013  (KR) .................. 10-2013-0001167

(51) Int. Cl.
*H01M 10/658* (2014.01)
*H01M 2/10* (2006.01)

(52) U.S. Cl.
CPC ....... *H01M 10/658* (2015.04); *H01M 2/1077* (2013.01)

(58) Field of Classification Search
CPC .......................... H01M 10/658; H01M 2/1077
USPC .......................................................... 429/99
See application file for complete search history.

(56) References Cited

U.S. PATENT DOCUMENTS

| | | | |
|---|---|---|---|
| 3,664,877 A | 5/1972 | Shaw | |
| 6,376,126 B1 | 4/2002 | Faust et al. | |
| 2004/0007374 A1 | 1/2004 | Higuchi | |
| 2006/0049799 A1 | 3/2006 | Hamada et al. | |
| 2007/0202396 A1 | 8/2007 | Jung | |
| 2010/0104927 A1 | 4/2010 | Albright | |
| 2011/0052965 A1 | 3/2011 | Kim et al. | |
| 2011/0097614 A1* | 4/2011 | Kim | H01M 2/0237 429/53 |
| 2011/0135985 A1 | 6/2011 | Kim | |
| 2012/0115011 A1 | 5/2012 | Kim | |
| 2012/0129022 A1* | 5/2012 | Kalish | H01M 2/1077 429/72 |
| 2013/0130078 A1 | 5/2013 | Schaefer et al. | |

FOREIGN PATENT DOCUMENTS

| | | |
|---|---|---|
| EP | 2 315 293 A1 | 4/2011 |
| JP | 2004-362879 A | 12/2004 |
| JP | 3982352 B2 | 9/2007 |
| JP | 2012-064357 A | 3/2012 |

(Continued)

OTHER PUBLICATIONS

U.S. Office Action dated May 21, 2015 in Corresponding U.S. Appl. No. 13/833,200.

(Continued)

*Primary Examiner* — Nicholas P D'Aniello
(74) *Attorney, Agent, or Firm* — Lee & Morse, P.C.

(57) ABSTRACT

A battery module including a plurality of battery cells arranged in one direction; heat insulating members interposed between the plurality of battery cells so as to control heat generated in the battery cells; and a housing fixing the battery cells and the heat insulating members.

6 Claims, 4 Drawing Sheets

(56) References Cited

FOREIGN PATENT DOCUMENTS

| | | |
|---|---|---|
| KR | 10-2006-0059704 A | 6/2006 |
| KR | 10 2008-0016044 A | 2/2008 |
| KR | 10 2008-0030215 A | 4/2008 |
| KR | 10-2011-0044129 A | 4/2011 |
| KR | 10-2011-0059982 A | 6/2011 |
| KR | 10-2011-0062851 | 6/2011 |
| KR | 10-2012-0099722 | 9/2012 |
| WO | WO 01/28008 A1 | 4/2001 |

OTHER PUBLICATIONS

U.S. Office Action dated Nov. 13, 2015 in Corresponding U.S. Appl. No. 14/165,801.
Korean Office Action dated Mar. 22, 2016.
Registration Determination Certificate issued by the Korean Industrial Property Office on Mar. 30, 2016 in the examination of Korean Patent Application No. 10-2013-1167.

\* cited by examiner

BATTERY MODULE

The present application claims priority under 35 U.S.C. §119 to Korean Patent Application No. 10-2013-0001167, filed on Jan. 4, 2013, in the Korean Intellectual Property Office, and entitled: "Battery Module," which is incorporated by reference herein in its entirety.

BACKGROUND

1. Field

Embodiments relate to a battery module.

2. Description of the Related Art

A high-power battery module using a non-aqueous electrolyte with high energy density has recently been developed. The high-power battery module is configured as a large-capacity battery module manufactured by connecting a plurality of battery cells in series so as to be used for driving devices, e.g., motors of electric vehicles and the like, which require high power.

SUMMARY

Embodiments are directed to a battery module.

The embodiments may be realized by providing a battery module including a plurality of battery cells arranged in one direction; heat insulating members interposed between the plurality of battery cells so as to control heat generated in the battery cells; and a housing fixing the battery cells and the heat insulating members.

Each of the heat insulating members may have a thickness of about 0.5 mm to about 2 mm.

Each of the heat insulating members may have a thermal conductivity of about 0.01 W/mK to about 0.5 W/mK.

Each of the heat insulating members may include a fiber sheet.

Each of the heat insulating members may include a vulcanized fiber sheet, the vulcanized fiber sheet being formed of cotton fiber or pulp fiber and cellulose.

Each of the heat insulating members has a size corresponding to a size of a wide surface of an adjoining battery cell of the plurality of battery cells.

Each of the heat insulating members may include a base portion on a wide surface of an adjoining battery cell of the plurality of battery cells, and first and second side portions respectively bent at end portions of the base portion.

The first and second side portions may have a size corresponding to a size of a side surface of the adjoining battery cell.

The heat insulating members may include first and second heat insulating members adjacent to each other, and ends of the first and second side portions of the first heat insulating member may respectively contact end portions of the base portion of the second heat insulating member.

Each of the heat insulating members may have a size corresponding to a size of a wide surface of an adjoining battery cell of the plurality of battery cells, and may include an inwardly recessed central portion and an edge surrounding the central portion.

The central portion of each heat insulating member may have a rounded section, and the edge of the heat insulating member may have a flat section.

The housing may include a pair of end plates disposed opposite to each other at an outside of the plurality of battery cells arranged in the one direction, and a pair of connection plates connecting the pair of end plates.

The heat insulating members may be further provided between each end plate and battery cells at ends of the plurality of battery cell arranged in the one direction.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
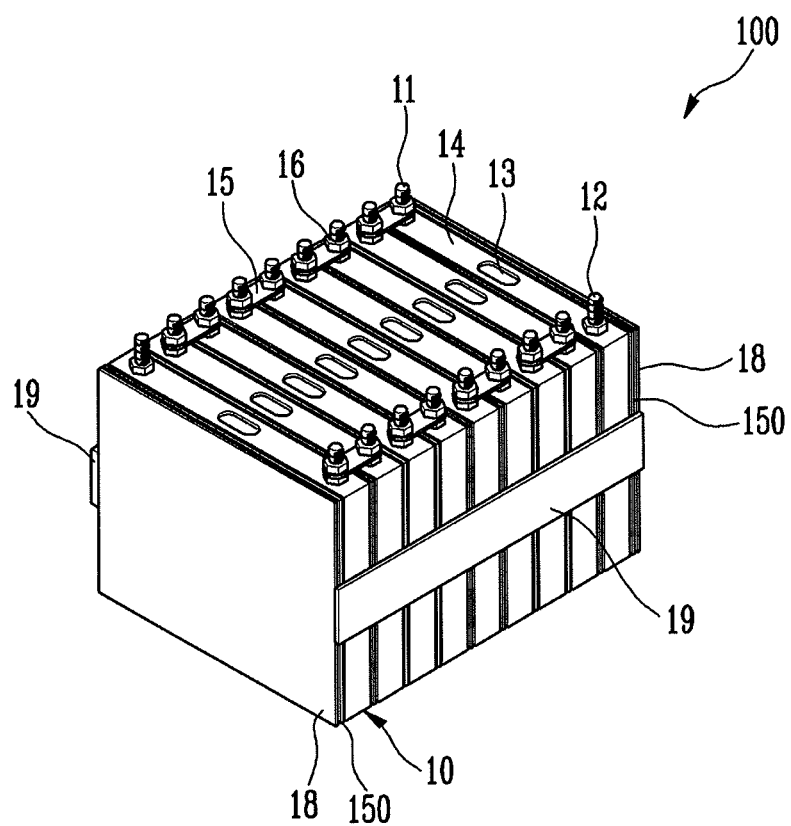
FIG. 1 illustrates a perspective view of a battery module according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
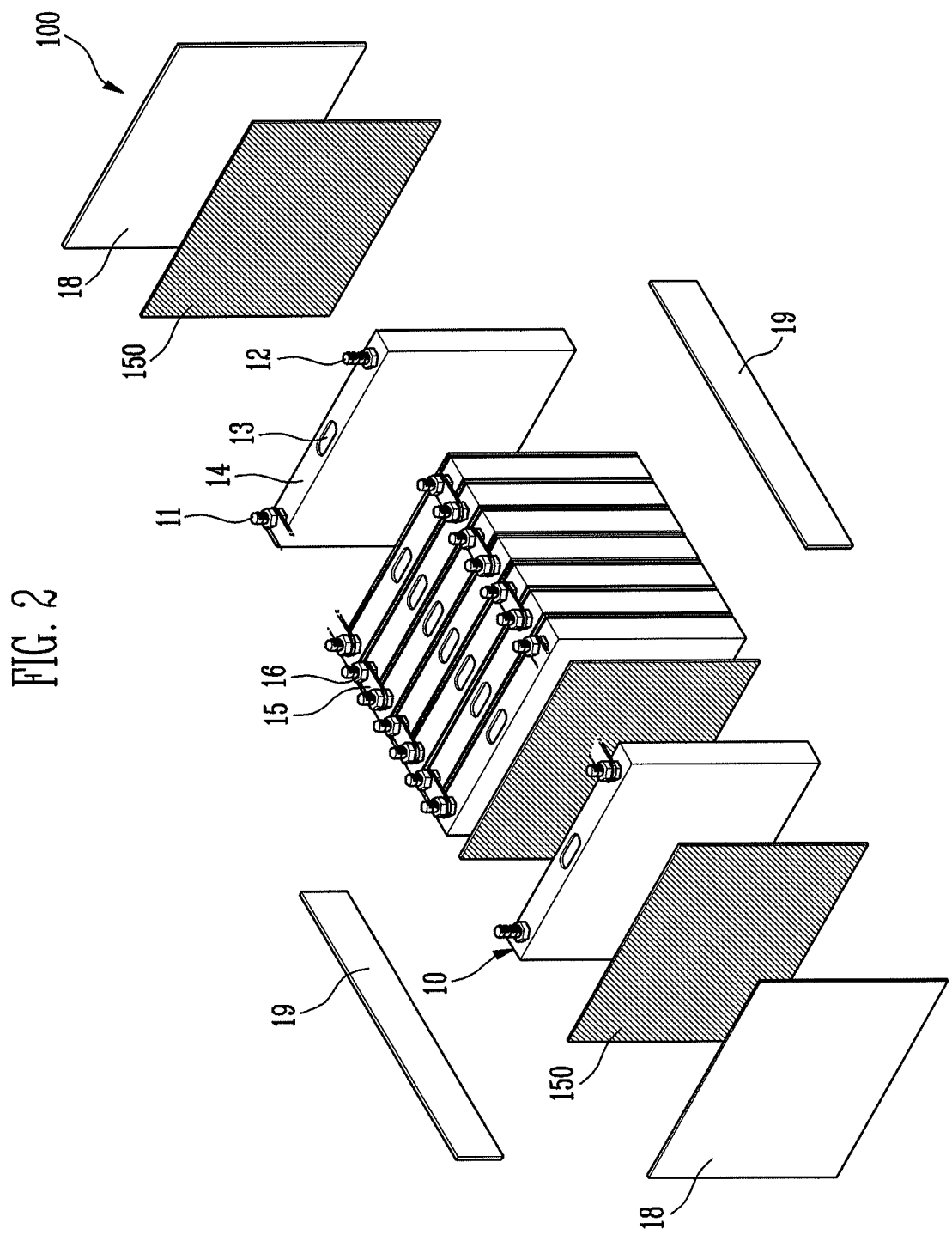
FIG. 2 illustrates an exploded perspective view of the battery module of FIG. 1.

FIG. 1 illustrates a perspective view of a battery module according to an embodiment. FIG. 2 illustrates an exploded perspective view of the battery module of FIG. 1.

The battery module 100 according to this embodiment may include a plurality of battery cells 10 arranged in one direction; thermal insulating members 150 interposed between the plurality of battery cells 10 so as to control heat generated from the battery cells 10; and a housing 18 and 19 fixing the battery cells 10 and the thermal insulating members 150.

The battery cell 10 may include a battery case, and an electrode assembly and an electrolyte (not illustrated), which are accommodated in the battery case. The electrode assembly may include a positive electrode plate, a negative electrode plate, and a separator interposed between the electrode plates. The electrode assembly and the electrolyte may react with each other to generate electrochemical energy. The battery case may be sealed with a cap assembly 14, and the cap assembly 14 may be provided with positive and negative electrode terminals 11 and 12 having different polarities, and a vent 13. The vent 13 is a safety means and may act as a passage along or through which gas generated inside the battery cell 10 is exhausted to the outside of the battery cell 10. The positive and negative electrode terminals 11 and 12 of adjacent battery cells 10 may be electrically connected to each other through a bus-bar 15, and the bus-bar 15 may be fixed by a nut 16 or the like.

The battery module 100 may be used as one power source, using the housing 18 and 19 accommodating the plurality of battery cells 10 therein. The housing 18 and 19 may include a pair of end plates 18 disposed opposite to each other at an outside of, e.g., outer ends of, the battery cells 10, and a pair of connection plates 19 connecting the pair of end plates 18 to each other. The plurality of battery cells 10 may be arranged in the one direction so that wide surfaces of the battery cells 10 are opposite to or facing each other, and the pair of end plates 18 may be provided on outermost surfaces of the arranged battery cells 10, respectively. In this case, the heat insulating member 150 may be further provided between the end plate 18 and the battery cells 10 at ends of the arranged group of battery cells 10.

Generally, a battery module includes a plurality of battery cells, and the battery cells may generate a large amount of heat while being charged/discharged. The heat may cause thermal runaway in the battery cell, and therefore, the separator of the electrode assembly in the battery cell may be melted. The melted separator may cause direct contact between positive and negative electrode plates, thereby resulting in a short circuit in the battery cell. Accordingly, the heat generated in the battery cell may be transferred to an adjacent battery cell, and thus, the arranged battery cells may consecutively malfunction and/or explode. In the process of assembling the battery module, metallic foreign matter (which may be difficult to see with the naked eye) may be frequently inserted between the battery cells. Therefore, scratches may be produced on the surface of the battery cell due to vibration or impact in the use of the battery module. The scratches may cause insulation breakdown on a surface of the battery cell, and therefore, a short circuit in the battery cells may occur.

In the battery module according to this embodiment, a heat insulating member 150 may be interposed between adjacent battery cells 10. The heat insulating member 150 may help reduce and/or prevent high-temperature or heat generated in the battery cell from being transferred to an adjacent battery cell 10. The heat insulating member 150 may be strong or resistant against vibration or impact. Thus, the heat insulating member 150 may effectively maintain the insulation between surfaces of the battery cells 10, which may otherwise be broken by metallic foreign matter that finds its way between the battery cells 10.

Figure 3:
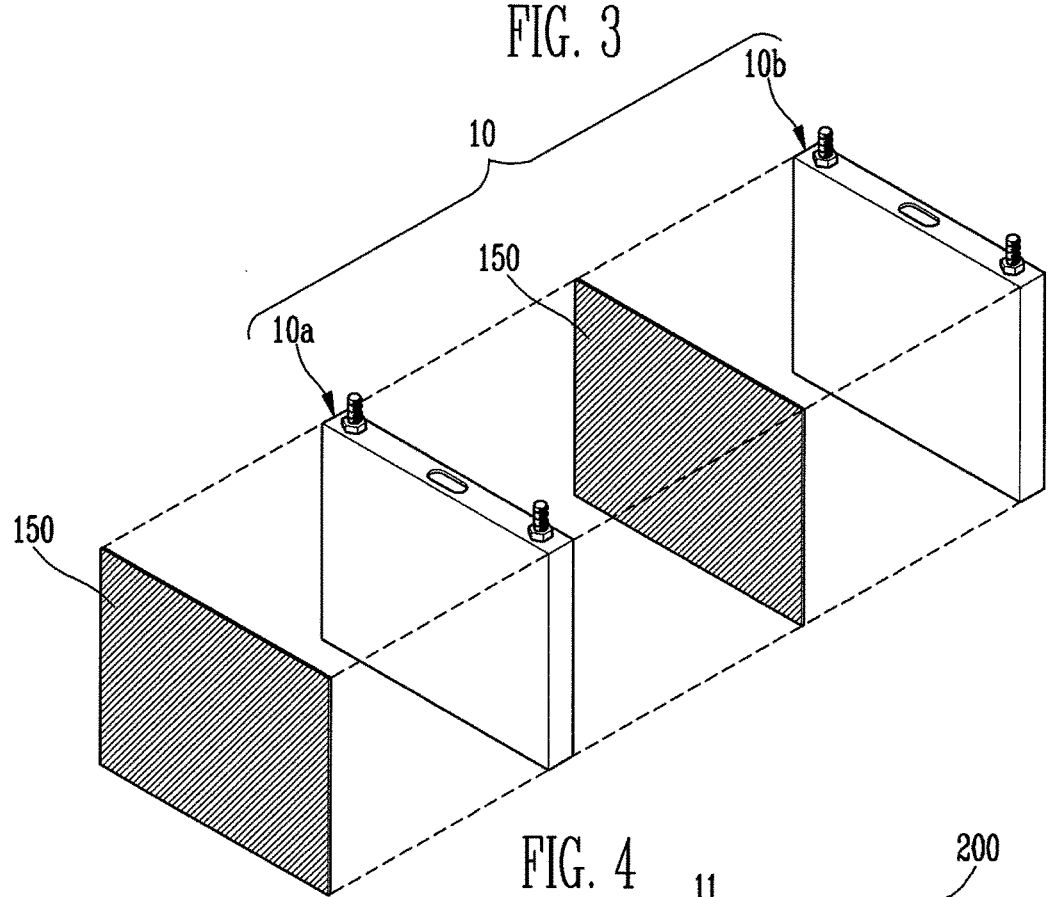
FIG. 3 illustrates a perspective view showing battery cells and heat insulating members according to an embodiment.

FIG. 3 illustrates a perspective view showing the battery cells and the heat insulating members according to an embodiment.

Referring to FIG. 3, the heat insulating member 150 may be interposed between adjacent battery cells 10, so as to help prevent the battery cells 10 from coming in direct contact with each other. In this case, the heat insulating member 150 may have a size corresponding to a size of a wide side surface of the battery cell 10. For example, the heat insulating member 150 may have a size, i.e., length and width, that is the same as the size of the wide side surface of the battery cell 10. Hereinafter, for convenience of illustration, the battery cells 10 arranged adjacent to each other are referred to as a first battery cell 10a and a second battery cell 10b.

A thickness t of the heat insulating member 150 may be about 0.5 mm to about 2 mm. Maintaining the thickness t of the heat insulating member 150 at about 0.5 mm or greater may help ensure that the heat insulating member 150 is able to sufficiently reduce and/or prevent thermal conduction between the first and second battery cells 10a and 10b. Thus, transfer of high-temperature heat from the first battery cell 10a to the second battery cell 10b may be reduced and/or prevented. Therefore, the safety of the battery module may be ensured. In the process of manufacturing the battery module, the insulation on the surface of the battery cell may be easily broken by foreign matter that may find its way between the first and second battery cells 10a and 10b. Maintaining the thickness t of the heat insulating member 150 at about 2 mm or less may help ensure that the spacing distance between the first and second battery cells 10a and 10b is not undesirably increased. Thus, the volume of the battery module per unit capacity may not be undesirably increased.

A thermal conductivity of the heat insulating member 150 may be about 0.01 W/mK to about 0.5 W/mK. Maintaining the thermal conductivity of the heat insulating member 150 at about 0.01 W/mK or higher may help ensure that high-temperature heat generated in the first battery cell 10a is not transferred to the second battery cell 10b without the use of a high-priced material in the manufacturing of the heat insulating member 150. Therefore, an unnecessary increase in the manufacturing cost of the heat insulating member 150 may be avoided. Maintaining the thermal conductivity of the heat insulating member 150 at about 0.5 W/mK or less may help reduce and/or prevent transfer of the heat generated in the first battery cell 10a to the second battery cell 10b.

In an implementation, the heat insulating member 150 may include a fiber sheet. The fiber sheet may be manufactured by providing a plurality of fiber-shaped materials to be entangled and compressing the materials. The fiber sheet may be provided with a large quantity of pores capable of capturing air therein. For example, the heat insulating member may include a vulcanized fiber sheet, and the vulcanized fiber sheet may be made of cotton fiber or pulp fiber and cellulose. The vulcanized fiber sheet may be manufactured by stacking and compressing the cotton fiber or pulp fiber and cellulose.

In an implementation, a cooling plate may be provided at a lower portion of the battery module, and a heat exchange medium, e.g., a coolant, may pass through an inside of the cooling plate. In this case, the coolant may perform a heat exchange with the bottom surface of the battery cell. Thus, the heat generated from each battery cell may be removed by the coolant.

Hereinafter, other embodiments will be described with reference to FIGS. 4 to 6B. Contents of these embodiments, except the following contents, may be similar to those of the embodiment described with reference to FIGS. 1 to 3, and therefore, repeated detailed descriptions may be omitted.

Figure 4:
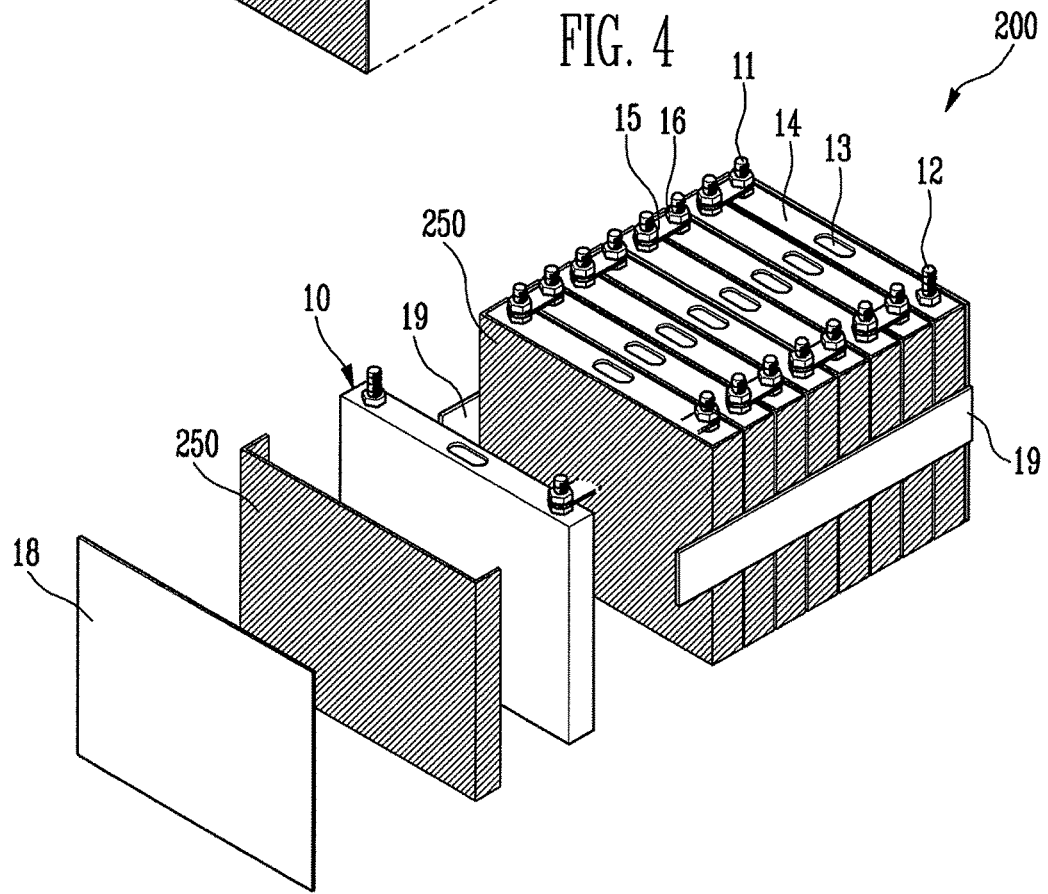
FIG. 4 illustrates a partial exploded perspective view of a battery module according to another embodiment.
Figure 5:
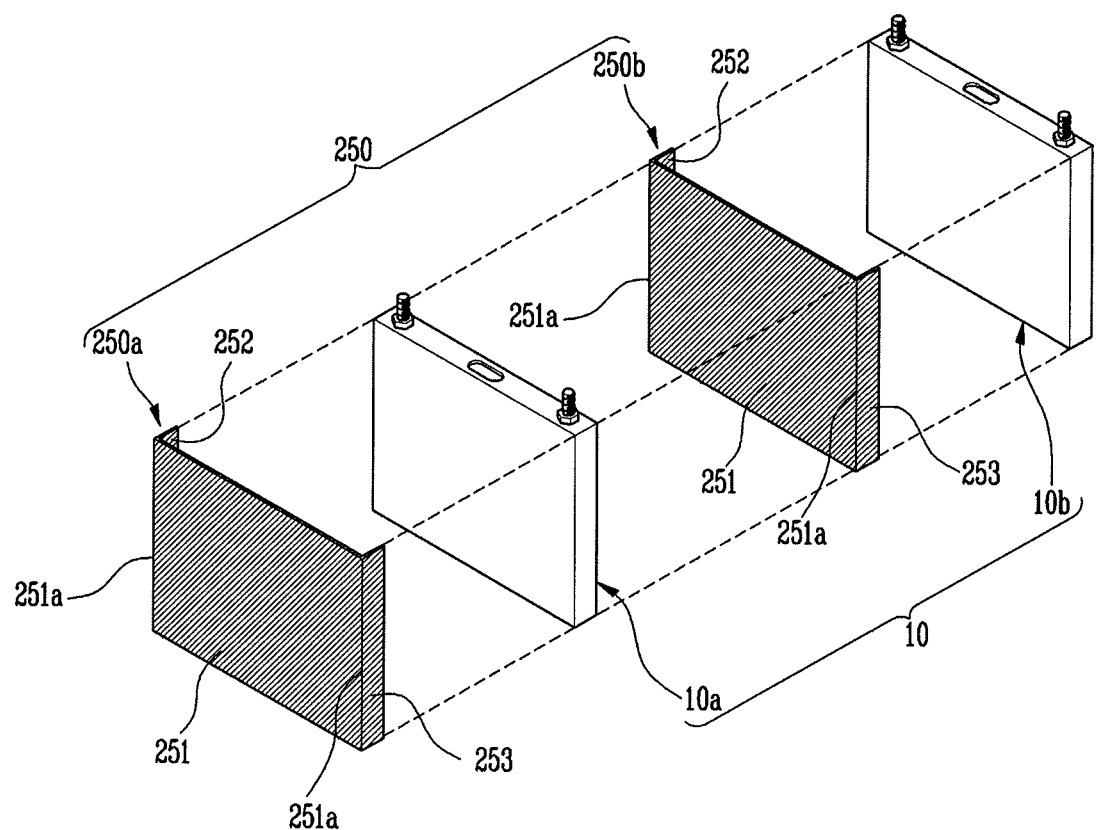
FIG. 5 illustrates a perspective view showing battery cells and heat insulating members according to an embodiment.

FIG. 4 illustrates a partial exploded perspective view of a battery module according to another embodiment. FIG. 5 illustrates a perspective view showing battery cells and heat insulating members according to the embodiment.

Referring to FIGS. 4 and 5, in the battery module 200 according to this embodiment, a plurality of battery cells 10 arranged in one direction may be fixed by a pair of end plates 18 and a pair of connection plates 19. In this case, heat insulating members 250 may be interposed between the battery cells 10. The heat insulating member 250 may include a base portion 251 (corresponding to a wide side surface of the battery cell 10), and first and second side portions 252 and 253 respectively bent from end portions 251a of the base portion 251. The first and second side portions 252 and 253 may be provided to respectively cover narrow side surfaces of the battery cell 10.

The heat insulating member 250 may help reduce and/or prevent the transfer of heat between adjacent first and second battery cells 10a and 10b, thereby improving the safety of the battery module 200. Similarly, when the adjacent heat insulating members 250 are a first heat insulating member 250a and a second heat insulating member 250b, the battery cell 10 may be provided between the first and second heat insulating members 250a and 250b. In this embodiment, for convenience of illustration, the adjacent heat insulating members 250 are referred to as the first and second heat insulating members 250a and 250b, and the adjacent battery cells 10 are referred to as the first and second battery cells 10a and 10b.

The first heat insulating member 250a may be provided on a front surface of the first battery cell 10a, and the second heat insulating member 250b may be provided between the first and second battery cells 10a and 10b. In this case, the base portions 251 of the first and second heat insulating members 250a and 250b may contact the wide side surfaces of the first and second battery cells 10a and 10b, and the first and second side portions 252 and 253 of the first and second heat insulating members 250a and 250b may be provided to have a size corresponding to the narrow side surface of the battery cell 10. Thus, ends of the first and second side portions 252 and 253 of the first heat insulating member 250a may extend toward the second heat insulating member 250a, so as to respectively contact both end portions 251a of the base portion 251 of the second heat insulating member 250b.

In the battery module 200 according to this embodiment, each of the heat insulating members 250 (interposed between the battery cells 10 arranged in the one direction) may cover the wide side surface of the battery cell 10 and both the narrow side surfaces of the battery cell 10. Thus, the heat insulating member 250 may insulate heat generated from the battery cell 10, so that it is possible to effectively prevent the heat from being transferred to the adjacent battery cells 10.

Figure 6A:
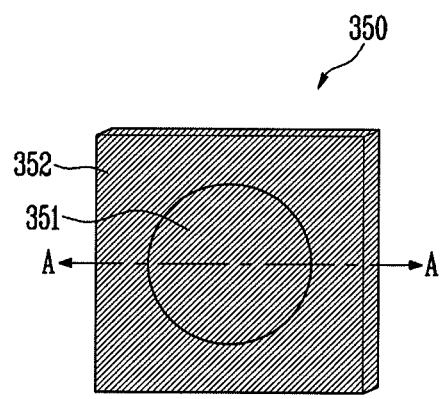
FIG. 6A illustrates a perspective view of a heat insulating member according to still another embodiment.
Figure 6B:
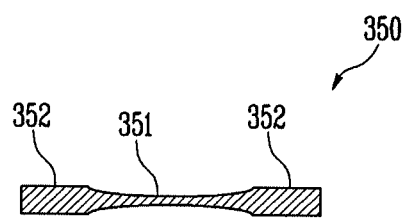
FIG. 6B illustrates a sectional view taken along line A-A of FIG. 6A.

FIG. 6A illustrates a perspective view of a heat insulating member according to still another embodiment. FIG. 6B illustrates a sectional view taken along line A-A of FIG. 6A.

Referring to FIGS. 6A and 6B, the heat insulating member 350 according to this embodiment may be interposed between adjacent battery cells so as to prevent high-temperature heat generated in any one battery cell from being transferred to other battery cells. The heat insulating member 350 may have a size corresponding to the wide side surface of the battery cell, i.e., the heat insulating member 350 may have a length and width about equal to the length and width of the wide surface of the battery cell. The heat insulating member 350 may include an inwardly recessed central portion 351, and an edge 252 surrounding the central portion 351. The central portion 351 of the heat insulating member 350 may have a round section, and the edge 352 of the heat insulating member 350 may have a flat section. For example, when viewed in cross section, as in FIG. 6B, the central portion 351 may have a rounded shape, and the edge portion 352 may have a flat or rectangular shape. In an implementation, the inwardly recessed central portion 351 may have a rounded, concave recess that is recessed from the flat outer surface of the edge portion 352.

The battery cells may generate gas as a side reaction while being charged/discharged a plurality of times. The gas may swell the battery cells. In this case, the battery cell may be swelled so that a central region of the battery cell may protrude outwardly due to the structural characteristics of the battery cell. In the heat insulating member 350 according to this embodiment, the central portion 351 (that is a portion corresponding to the swelled portion of the battery cell) may have the round section or rounded cross section. Thus, in a case where the battery cell is swelled, the central portion 351 may provide a space corresponding to the swelled central region of the battery cell, so that it is possible to reduce the likelihood and/or prevent an entire shape of the battery module from being changed. Further, an external shape of corner sides of the battery cell may hardly be changed. Thus, the corner sides of the battery cell may be stably fixed by the edge 352 of the heat insulating member 350. In an implementation, the central portion 351 may have a rounded, e.g., circular, shape. In an implementation, the edge 352 of the heat insulating member 350 may surround the central portion 351 and may form a rectangular outer shape of the heat insulating member 350. For example, outer dimensions of the edge portion 352 forming rectangular outer shape of the heat insulating member 350 may correspond with, i.e., may be about equal to, a size and shape or dimensions of a corresponding one of the battery cells.

By way of summation and review, an electrochemical reaction occurs in a battery cell, and heat may be generated as the electrochemical reaction proceeds. The heat generated as described above may cause the battery cell to be deteriorated, thereby lowering the reliability of the battery cell. For example, in a high-capacity battery cell, the amount of heat generated in the battery cell may be further increased. Such an occurrence may be likely in a battery module including a set of battery cells, which may result in fire, explosion, or the like.

The embodiments provide a battery module having improved safety.

The embodiments provide a battery module having improved safety using a new member.

The embodiments also provide a battery module for effectively controlling heat generated in a plurality of battery cells.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
a plurality of battery cells arranged in one direction;
heat insulating members interposed between the plurality of battery cells so as to control heat generated in the battery cells, the heat insulating members including first and second heat insulating members adjacent to each other, each of the heat insulating members including a base portion, and first and second side portions respectively bent from end portions of the base portion such that the first and second side portions are of one continuous piece with the base portion; and
a housing fixing the battery cells and the heat insulating members, wherein:

each of the heat insulating members includes a vulcanized fiber sheet, the vulcanized fiber sheet being formed of cotton fiber or pulp fiber and cellulose, each of the heat insulating members has a thickness of about 0.5 mm to about 2 mm, each of the heat insulating members has a size corresponding to a size of a wide surface of an adjoining battery cell of the plurality of battery cells, each of the heat insulating members includes an inwardly recessed central portion and an edge surrounding the central portion, the central portion of each heat insulating member having a circular section and the edge of the heat insulating member has a flat section, and ends of the first side portion and the second side portion of the first insulating member contact both end portions of the base portion of the second insulating member but are not coupled to the end portions of the base portion of the second insulating member.

2. The battery module as claimed in claim 1, wherein each of the heat insulating members has a thermal conductivity of about 0.01 W/mK to about 0.5 W/mK.

3. The battery module as claimed in claim 1, wherein, for each of the first and second heat insulating members, the base portion is on the wide surface of the adjoining battery cell of the plurality of battery cells.

4. The battery module as claimed in claim 3, wherein the first and second side portions have a size corresponding to a size of a side surface of the adjoining battery cell.

5. The battery module as claimed in claim 1, wherein the housing includes:

a pair of end plates disposed opposite to each other at an outside of the plurality of battery cells arranged in the one direction, and a pair of connection plates connecting the pair of end plates.

6. The battery module as claimed in claim 5, wherein the heat insulating members are further provided between each end plate and battery cells at ends of the plurality of battery cell arranged in the one direction.

* * * * *